United States Patent
Turner et al.

(10) Patent No.: US 6,443,130 B1
(45) Date of Patent: Sep. 3, 2002

(54) FUEL DEMAND REGULATOR

(75) Inventors: Chris Turner, Whitewater; Robert D. Kern, Waukesha; Gerald C. Ruehlow, Oconomowoc; Jeff Vranak, Whitewater; Dawei Chen, Brookfield, all of WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 09/749,363

(22) Filed: Dec. 27, 2000

(51) Int. Cl.[7] ............................ F02M 41/00; F02B 77/00
(52) U.S. Cl. .................... 123/455; 123/457; 123/198 D
(58) Field of Search ................................ 123/446, 458, 123/455, 451, 457, 460, 463, 510, 511, 512, 513, 515, 198 D, 198 DB; 137/487.5; 251/129.04, 129.08, 129.15

(56) References Cited

U.S. PATENT DOCUMENTS

| | | | | |
|---|---|---|---|---|
| 3,946,714 A | * | 3/1976 | Eckert et al. ................ | 123/455 |
| 4,325,343 A | * | 4/1982 | Turner ........................ | 123/527 |
| 4,745,903 A | * | 5/1988 | Gmelin ....................... | 123/452 |
| 4,941,447 A | * | 7/1990 | Mannhardt .................. | 123/455 |
| 5,101,799 A | * | 4/1992 | Davis et al. ................ | 123/527 |
| 5,341,785 A | * | 8/1994 | Meaney ...................... | 123/452 |
| 5,509,395 A | * | 4/1996 | Cook .......................... | 123/518 |
| 5,775,309 A | * | 7/1998 | Burrahm ..................... | 123/575 |
| 5,803,056 A | * | 9/1998 | Cook et al. ................. | 123/520 |
| 5,967,487 A | * | 10/1999 | Cook et al. .................. | 251/64 |
| 5,979,408 A | * | 11/1999 | Wakabayashi et al. ...... | 123/455 |
| 6,068,017 A | * | 5/2000 | Haworth et al. ............ | 137/271 |
| 6,145,495 A | * | 11/2000 | Whitcome et al. .......... | 123/525 |

* cited by examiner

*Primary Examiner*—Tony M. Argenbright
*Assistant Examiner*—Hai Huynh
(74) *Attorney, Agent, or Firm*—Boyle Fredrickson Newholm Stein & Gratz S.C.

(57) ABSTRACT

A fuel regulator is provided for regulating the supply of fuel to a multi-cylinder engine. The regulator includes a regulator body defining a holding chamber connectable to a fuel source; a first supply chamber connectable to a first cylinder of the multi-cylinder engine; and a second supply chamber connectable to a second cylinder of the multi-cylinder engine. Orifices are provided between the supply chambers and the holding chamber. A first regulating structure is movable between a closed position wherein the orifice between the holding chamber and the first supply chamber is closed and an open position wherein the orifice between the holding chamber and the supply chamber is open in response to the fuel demanded by the first cylinder of the multi-cylinder engine. A second regulating structure is also movable between a closed position wherein the orifice between the holding chamber and the second supply chamber is closed and an open position wherein the orifice between the holding chamber and the second supply chamber is opened in response to the fuel demanded by the second cylinder of the engine.

20 Claims, 5 Drawing Sheets

FUEL DEMAND REGULATOR

FIELD OF THE INVENTION

This invention relates generally to fuel demand regulators for engines, and in particular, to a fuel demand regulator which provides fuel independently to each cylinder of a multi-cylinder engine.

BACKGROUND AND SUMMARY OF THE INVENTION

As is known, engines are utilized in a wide variety of applications including stand-by electrical generators. When used in connection with a stand-by electrical generator, an engine typically utilizes a pressurized fuel such as liquid propane and/or natural gas. Further, the engine is often directly connected to the fuel source in order that the generator may be automatically activated in the event of a power outage. Various types of regulator systems have been developed to interconnect the engine to the fuel source in order to provide the proper volume of fuel to the engine.

Heretofore, these prior art regulator systems typically incorporate a regulator having the supply chamber operatively connected to an input of an intake manifold. The outputs of the intake manifold are interconnected to corresponding cylinders of the engine. When the engine is started, fuel is drawn into the intake manifold, and hence each cylinder of the engine, by a vacuum generated by the engine during operation. While functional for its intended purpose, the use of an engine manifold and a regulator having a single chamber is inefficient since fuel is provided to each cylinder of the engine at a common pressure. As a result, each cylinder of the engine does not receive an optimum volume of fuel during operation and the engine does not generate maximum power.

In addition to the regulator, most of the prior art regulator systems often incorporate an automatic shut-off mechanism for preventing the fuel source from providing fuel to the regulator when the engine of the stand-by electrical generator is not in operation. This fuel shut-off feature is often required by state law in order to increase the safety of the stand-by electrical generator. By providing the automatic shut-off mechanism as a separate component, the cost of prior regulator systems is increased.

In addition to the automatic shut-off mechanism and the regulator, prior art regulator systems incorporate a fuel adjuster for adjusting the flow of fuel from the regulator to the intake manifold. The fuel adjuster is necessary because the BTU content of natural gas differs at different locations throughout the world. As such, if the flow of fuel to the intake manifold of the engine was fixed, in areas where the natural gas has a higher BTU content, an engine would run rich and would be unable to achieve maximum power. Similarly, in areas where the natural gas has a lower BTU content, the engine would run lean and would be unable to achieve maximum power.

Therefore, it is a primary object and feature of the present invention to provide a regulator which provides fuel independently to each cylinder of an engine.

It is a further object and feature of the present invention to provide a regulator which incorporates an automatic shut-off mechanism for controlling the flow of fuel to the regulator from a fuel source.

It is a still further object and feature of the present invention to provide a regulator which incorporates a fuel adjuster in order that a user may adjust the flow of fuel from the regulator to the cylinder of the engine.

It is a still further object and feature of the present invention to provide a regulator which is simple and inexpensive to manufacture.

In accordance with the present invention, a regulator is provided for regulating the supply of fuel to an engine. The regulator includes a regulator body defining a holding chamber connectable to a fuel source, a supply chamber connectable to the engine and an orifice therebetween. A solenoid is connectable to the engine and moved between a closed position for preventing the flow of fuel into the holding chamber and an open position allowing the flow of fuel into the holding chamber in response to activation of the engine. A regulating structure is movable between a closed position wherein the orifice is closed and an open position wherein the orifice is opened in response to the demand of fuel by the engine.

The regulator may include a fuel source conduit having an input connectable to the fuel source and an output communicating with the holding chamber in the regulator body. An engine conduit has an input communicating with the supply chamber in the regulator body and an output connectable to the engine. A fuel adjuster extends into the engine conduit. The fuel adjuster is movable between first and second positions for regulating the volume of fuel flowing therepast.

The regulating structure includes a lever having first and second opposite ends. The lever is pivotably mounted to the regulator body within the supply chamber and is pivotable between a first closing position and a second open position. A seal is mounted on the first end of the lever. The seal overlaps the orifice with the lever in the closing position. The regulating structure further includes a diaphragm interconnected to the second end of the lever. The diaphragm is movable within the supply chamber in response to the fuel demand of the engine between a first position wherein the lever is in the closing position and the second position wherein the lever is in the open position. A biasing structure urges the diaphragm towards the first position.

In accordance with a further aspect of the present invention, a regulator is provided for regulating the supply of fuel to each cylinder of a multi-cylinder engine. The regulator includes a regulator body defining a first supply chamber and a second supply chamber. Each supply chamber is connectable to a fuel source. A first cylinder conduit has an input communicating with the first supply chamber in the regulator body and an output connectable to the first cylinder of the engine. A second cylinder conduit has an input communicating with the second supply chamber in the regulator body and an output connectable to a second cylinder of the engine.

A fuel source conduit has an input connectable to a fuel source and an output communicating with the first and second chambers in the regulator body. The regulator body defines a holding chamber and includes a first orifice between the holding chamber and first supply chamber and a second orifice between the second holding chamber and the second supply chamber. The output of the fluid source conduit communicates with the holding chamber. A solenoid is connectable to the engine and is movable in response to activation of the engine between a closed position wherein the flow of fluid from the fuel source conduit to the holding chamber is prevented and an open position wherein the flow of fuel from the fuel source conduit to the holding chamber is allowed.

The regulator may further include a first regulating structure movable between the closed position wherein the first orifice is closed and an open position wherein the first orifice is opened in response to the fuel demanded by the first cylinder of the engine. In addition, a second regulating structure is provided. The second regulating structure is movable between a closed position wherein the second orifice is closed and an open position wherein the second orifice is opened in response to the fuel demanded by the second cylinder of the engine.

The first regulating structure includes a lever having first and second opposite ends. The lever of the first regulating structure is pivotably mounted to the regulator body within the first supply chamber and is pivotable between a first closing position and a second open position. A seal is mounted on the first end of the lever. The seal overlaps the first orifice with the lever in the closing position. A diaphragm is movably disposed in the first chamber and is interconnected to the second end of the lever such that the diaphragm moves the lever between the closing and open positions in response to the fuel demanded by the engine.

The second regulating structure also includes a lever having first and second opposite ends. The lever of the second regulating structure is pivotably mounted to the regulator body within the second supply chamber and is pivotable between a first closing position and a second open position. A seal is mounted on the first end of the lever of the second regulating structure. The seal of the second regulating structure overlaps the second orifice with the lever of the second regulating structure in the closing position. A diaphragm is moveable disposed in the second supply chamber and is interconnected to the second end of the lever of the second regulating structure such that diaphragm of the second regulating structure moves the lever of the second regulating structure between the closing and open positions in response to the fuel demanded by the second cylinder of the engine.

A first fuel adjuster extends into the first cylinder conduit. The first fuel adjuster is movable between the first and second positions for regulating the volume of fuel flowing therepast. A second fuel adjuster extends into the second cylinder conduit. The second fuel adjuster is movable between first and second positions for regulating the volume of fuel therepast.

In accordance with a still further aspect of the present invention, a system is provided for regulating the flow of fluid to each cylinder of an engine of a generator. The system includes a controller for sensing activation of the generator. A regulator body defines a holding chamber having an inlet, a first supply chamber having an outlet, and a second supply chamber having an outlet. The regulator body includes a first orifice between the holding chamber and the first supply chamber and a second orifice between the holding chamber and the second supply chamber. A fuel source conduit has an input connectable to a fuel source and an output operatively connected to the input of the holding chamber in the regulator body. A first cylinder conduit has an input operatively connected to the output of the first supply chamber in the regulator body and an output connectable to the first cylinder of the engine. A second cylinder conduit has an input operatively connected to the output of the second supply chamber in the regulator body and an output connectable to a second cylinder of the engine. A solenoid is operatively connected to the controller. The solenoid has a plunger which is movable between a first closed position wherein the plunger is seated within the input to the holding chamber so as to prevent the flow of fuel into the holding chamber from the fuel source conduit and a second open position wherein the plunger is removed from the input of the holding chamber so as to allow the flow of fuel into the holding chamber from the fuel source conduit in response to the controller sensing activation of the engine. A first regulating structure is disposed in the first supply chamber and is movable between a first closed configuration wherein the first orifice is closed and a second open configuration wherein the first orifice is open in response to the fuel demanded by the first cylinder of the engine. A second regulating structure is disposed in the second supply chamber. The second regulating structure is movable between a first closed configuration wherein the second orifice is closed and a second open configuration wherein the second orifice is opened in response to the fuel demanded by the second cylinder of the engine.

A first regulating structure includes a lever having first and second opposite ends. The lever is pivotably mounted to the regulator body within the first supply chamber and is pivotable between a first closing position wherein the first regulating structure is in the closed configuration and a second open position wherein the first regulating structure is in the open configuration. A seal is mounted on the first end of the lever of the first regulating structure. The seal overlaps the first orifice with the lever in the closed position. A diaphragm is moveably disposed in the first supply chamber. The diaphragm is interconnected to the second end of the lever such that the diaphragm moves the lever between the closing and open positions in response to the fuel demanded by the first cylinder of the engine.

The second regulating structure includes a lever having first and second opposite ends. The lever of the second regulating structure is pivotably mounted to the regulator body within the second supply chamber and is pivotable between a first closing position wherein the second regulating structure is in the closed configuration and a second open position wherein the second regulating structure is in the open configuration. A seal is mounted on the first end of the lever of the second regulating structure. The seal of the second regulating structure overlaps the second orifice when the lever of the second regulating structure is in the closing position. A diaphragm is moveably disposed in the second supply chamber. The diaphragm is interconnected to the second end of the lever of the second regulator structure such that the diaphragm of the second regulating structure moves the lever of the second regulating structure between the closing and open position in response to the fuel demanded by the second cylinder of the engine.

The diaphragm of the first regulating structure is movable between a first cutoff position wherein the lever of the first regulating structure is in the closing position and a second open position wherein the lever of the first regulating structure is in the open position. The diaphragm of the second regulating structure is also movable between a first cutoff position wherein the lever of the second regulating structure is in the closing position and a second open position wherein the lever of the second regulating is in the open position.

It is contemplated that the system further include a first fuel adjuster extending into the first cylinder conduit. The first fuel adjuster being movable between first and second positions for regulating the volume of fuel flowing therepast. A second fuel adjuster extends into second cylinder conduit. The second fuel adjuster is movable between first and the second positions for regulating the volume of fuel flowing therepast. It is contemplated that the holding chamber of the regulator body include a second input for connecting the system to an alternate fuel source.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

BRIEF DESCRIPTION OF THE DRAWINGS

Figure 1:
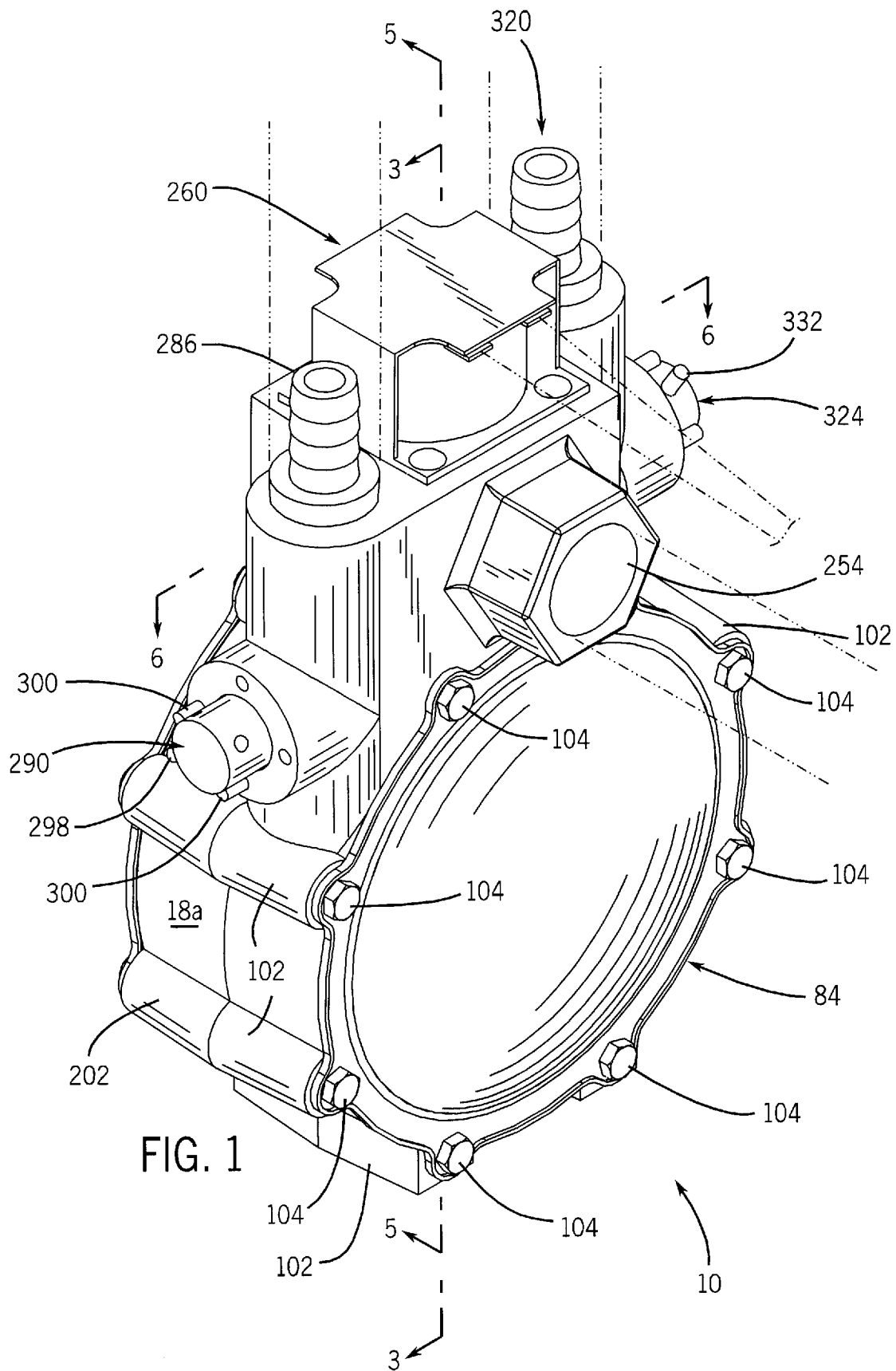
FIG. 1 is an isometric view of a regulator in accordance with the present invention.

Referring to FIG. 1, a regulator in accordance with the present invention is generally designated by the reference numeral 10. As hereinafter described, it is intended that regulator 10 interconnect a fuel source to an engine 12 of a stand-by electrical generator 11, FIG. 7. In the preferred embodiment, regulator 10 is used in connection with a two-cylinder engine 12, FIG. 7, but it can be appreciated that regulator 10 may be modified to be utilized in connection with other types of engines, regardless of the number of cylinders, without deviating from the scope of the present invention.

Figure 2:
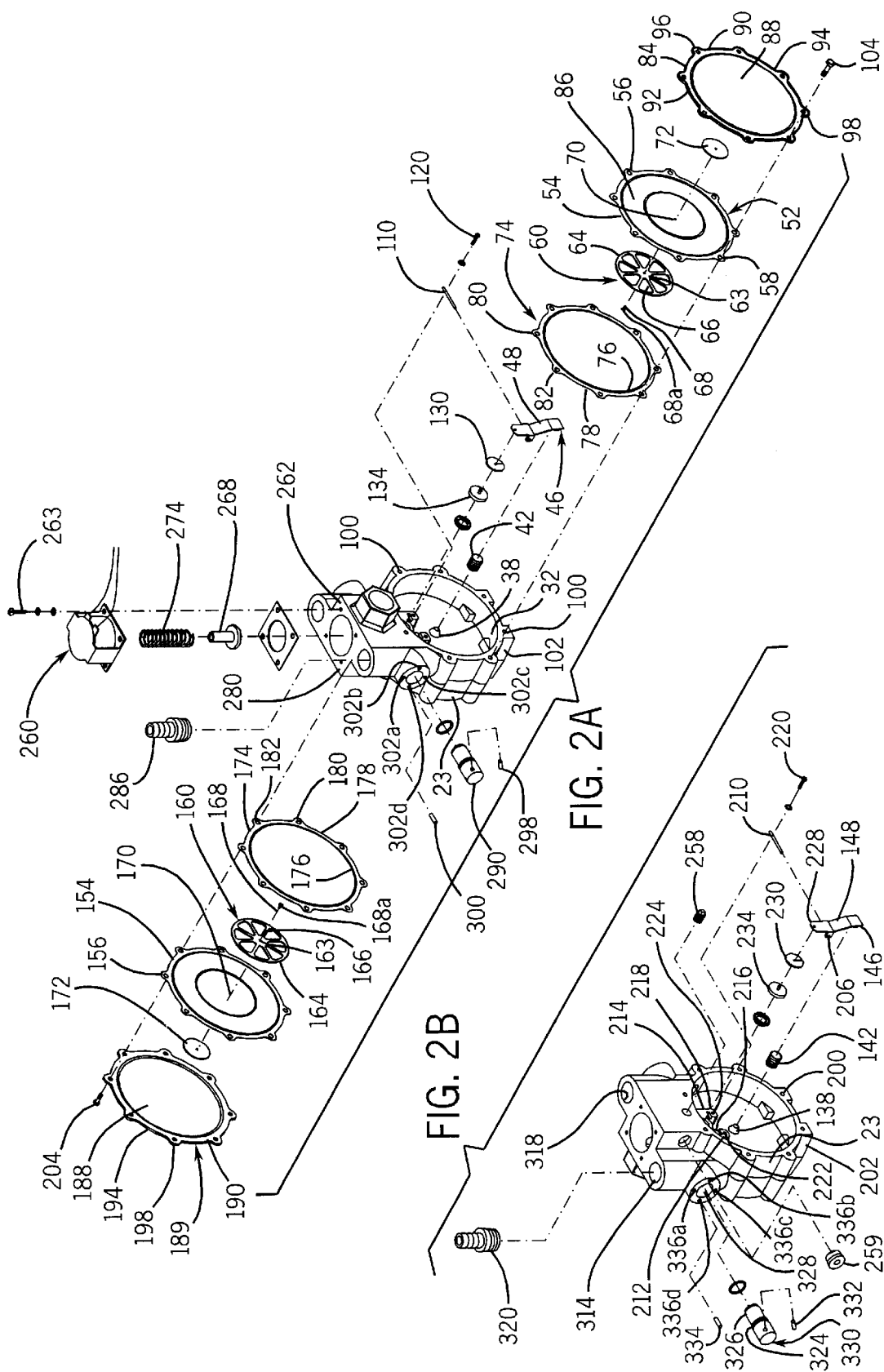
FIG. 2A is an exploded view of a portion of the regulator of FIG. 1.
FIG. 2B is an exploded view of a portion of the regulator of FIG. 1.
Figures 3, 4:
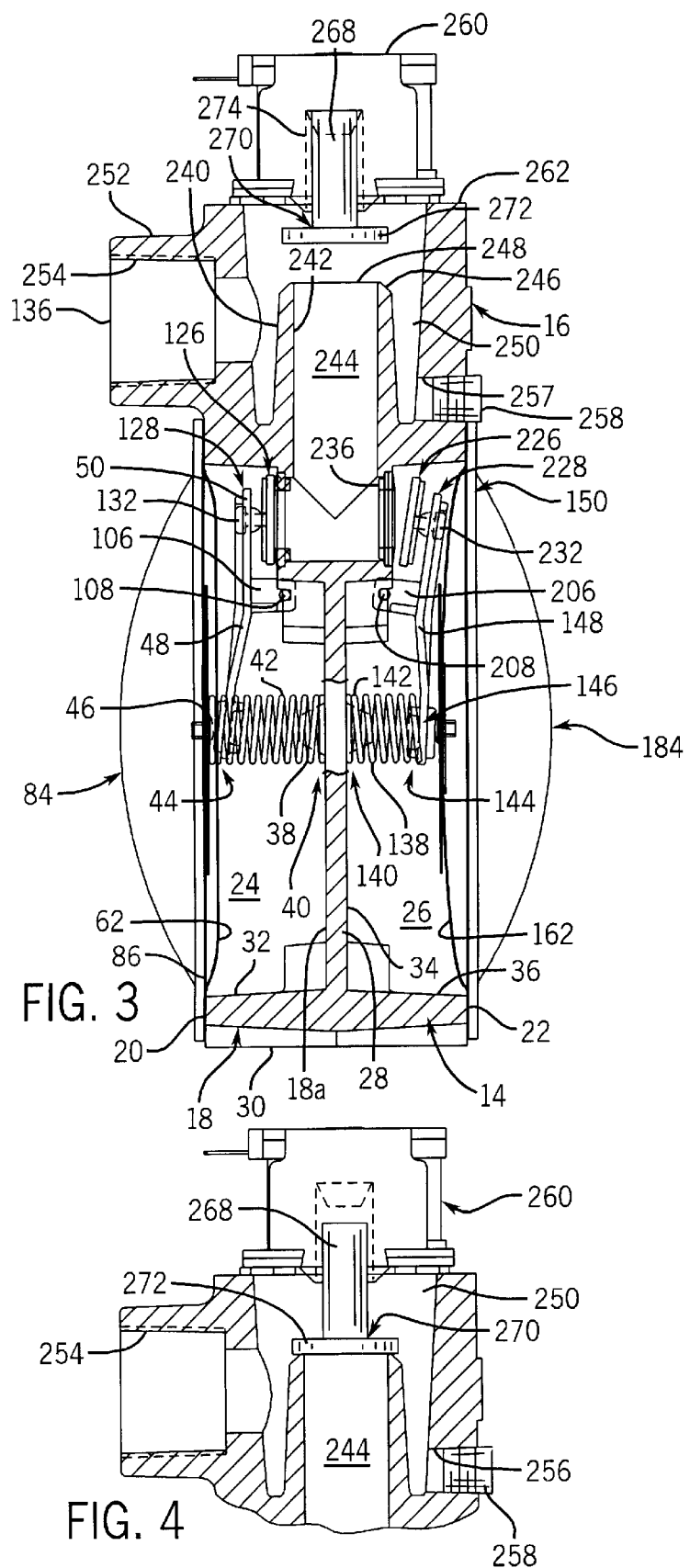
FIG. 3 is a cross-sectional view of the regulator of FIG. 1 taken along line 3—3.
FIG. 4 is an enlarged cross-sectional view, similar to FIG. 3, showing the regulator of the present invention.
Figure 5:
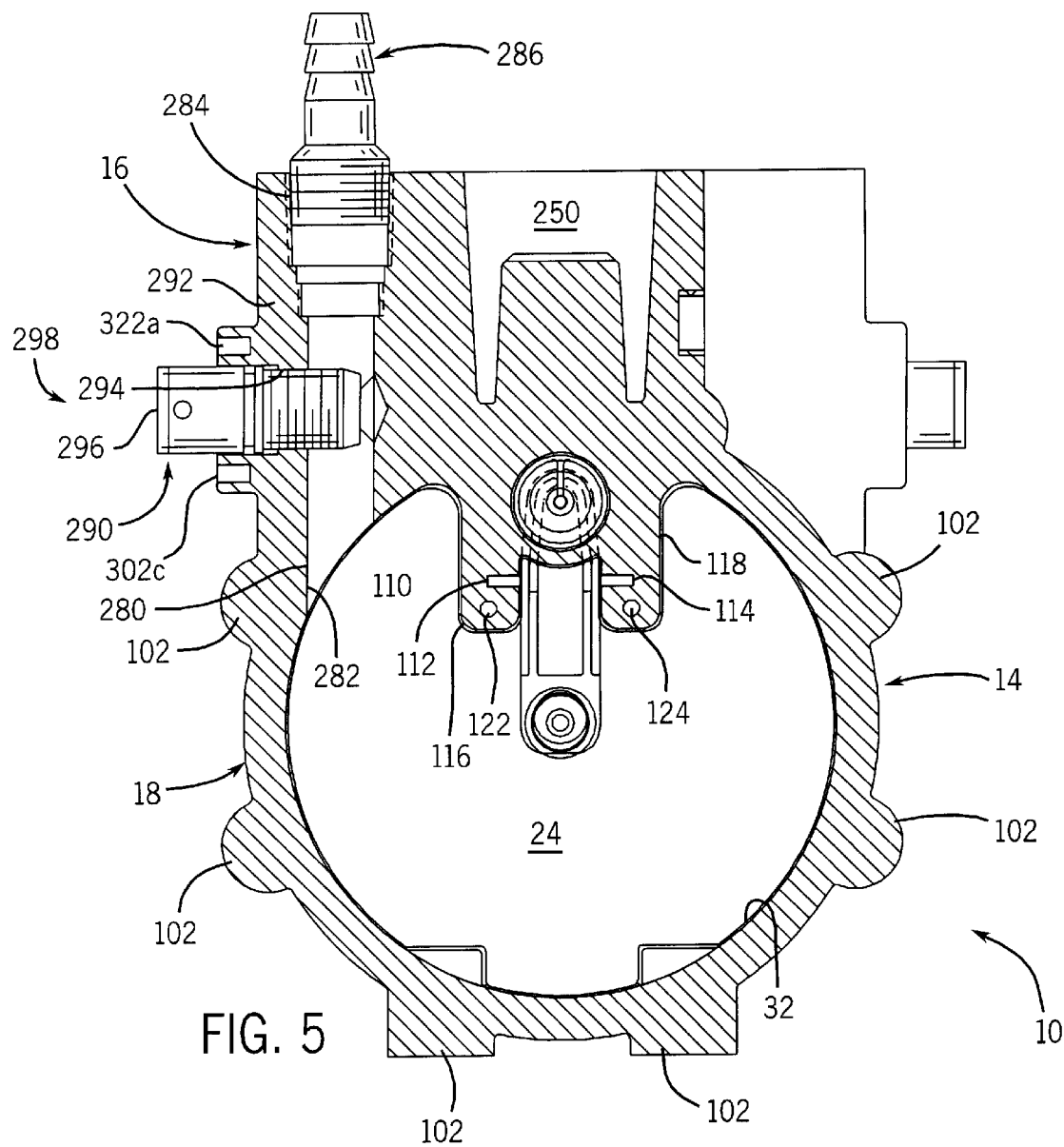
FIG. 5 is a cross-sectional view of the regulator of FIG. 1 taken along line 5—5.
Figure 6:
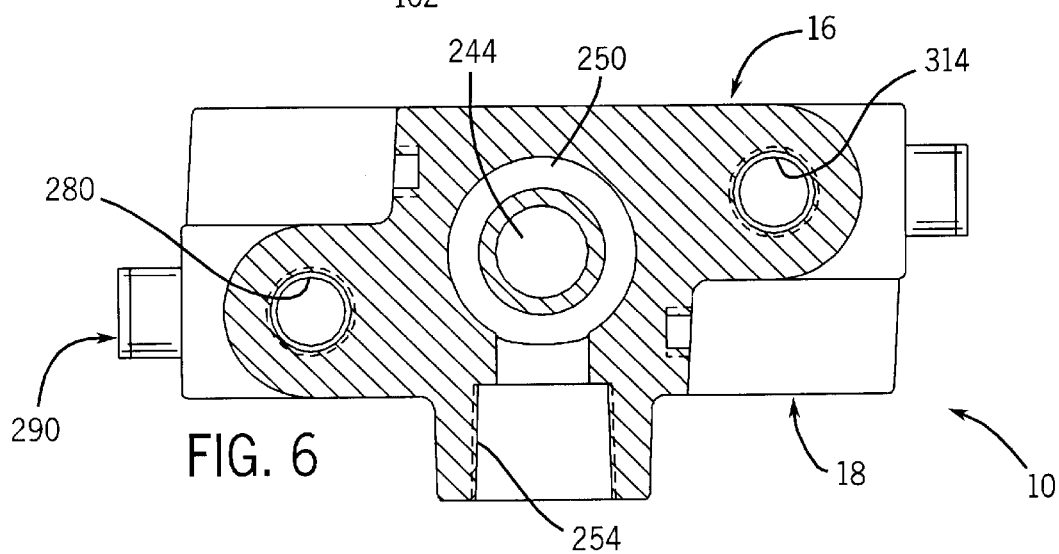
FIG. 6 is a cross-sectional view of the regulator of FIG. 1 taken along line 6—6.

As best seen in FIGS. 2A–2B and 3, regulator 10 includes a regulator body 14 which includes a first holding chamber portion 16 and a supply chamber portion 18. Supply chamber portion 18 of regulator body 14 includes first and second opposite sides 20 and 22 interconnected by an outer periphery 23.

Supply chamber portion 18 of regulator body 14 defines first and second supply chambers 24 and 26, respectively, which project inwardly from corresponding sides 20 and 22, respectively, thereof. First and second supply chambers 24 and 26, respectively, are separated by a central wall 28. Central wall 28 includes a first surface 30 spaced from side 20 of regulator body 14 by surface 32. It can be appreciated that first surface 30 of central wall 28 and surface 32 within regulator body 14 partially define first supply chamber 24. Central wall 28 includes a second surface 34 which is generally parallel to and spaced from side 22 of regulator body 14 by surface 36 within regulator body 14. It can be appreciated that second surface 34 of central wall 28 and surface 36 within regulator body 14 partially define second supply chamber 26.

A generally conical spring retention member 38 projects axially from first surface 30 of central wall 28 into first supply chamber 24. A first end 40 of a spring 42 is positioned over spring retention member 38 so as to prevent spring 42 from sliding along first surface 30 of central wall 28. A second end 44 of spring 40 is interconnected to a lower end 46 of lever 48, and urges second end 46 of lever 48 into contact with diaphragm structure 50, as hereinafter described. Diaphragm structure 50 includes a generally circular diaphragm 52 formed from a flexible material. Diaphragm 50 includes a radially outer edge 54 having a plurality of circumferentially spaced ears 56 projecting radially therefrom. Each ear 56 projecting from the outer edge 54 of diaphragm 52 includes a corresponding mounting aperture 58 therethrough.

Diaphragm support 60 is positioned against a first side 62 of diaphragm 52. Diaphragm support 60 is generally circular in shape and has a diameter less than the diameter of diaphragm 52. Diaphragm support 60 includes a central hub 63 and an outer ring 64 interconnected by a plurality of circumferentially spaced spokes 66. Diaphragm support 60 is interconnected to a first side 62 of diaphragm 52 by a rivet 68 which extends through central hub 63 of diaphragm support 60; through center 70 of diaphragm 52; and through center of support disc 72 to maintain the connection between diaphragm support 60 and diaphragm 52.

Diaphragm structure 50 further includes a ring-shaped gasket or seal 74 having an inner edge 76 and a radially outer edge 78 with a plurality of ears 80 projecting radially therefrom. Ears 80 includes corresponding mounting apertures 82 therethrough which are aligned with corresponding mounting apertures 58 in ears 56 of diaphragm 52. Cover 84 is positioned adjacent second side 86 of diaphragm 52. Cover 84 includes a cup-shaped inner portion 88 having a radially outer edge 90. A ring portion 92 is interconnected to the radially outer edge 90 of inner portion 88. Ring portion 92 includes a radially outer edge 94 having a plurality of ears 96 projecting therefrom. Ears 96 include corresponding mounting apertures 98 extending therethrough which are aligned with corresponding mounting apertures 58 and 82 in diaphragm 52 and in seal 74, respectively.

In order to mount diaphragm structure 50, seal 74 is positioned adjacent first side 20 of regulator body 14 such that radially inner edge 76 of seal 74 is aligned with the intersection of side 20 and surface 32 of regulator body 14 such that mounting apertures 82 through ears 80 of seal 74 are axially aligned with corresponding mounting holes 100 extending through circumferentially spaced lobes 102 projecting from the outer periphery 18a of supply chamber portion 18 of regulator body 14. Bolts 104 are threaded through corresponding mounting apertures 98 through ears 96 of cover 84; through corresponding mounting apertures 58 through ears 56 of diaphragm 52; through corresponding mounting apertures 82 through ears 80 of seal 74 and into corresponding mounting holes 100 in lobes 102. In the assembled configuration, rivet head 68a of rivet 68 engages lower end 46 of lever 48 such that diaphragm 52 is free to be drawn into and out of first supply chamber 24.

Lever 48 within first supply chamber 24 further includes a pair of mounting flanges 106 projecting therefrom. Each mounting flange 106 includes an opening 108 therethrough. As best seen in FIGS. 2A–5, pin 110 extends through openings 108 in mounting flanges 106. Opposite ends of pin 110 are seated within corresponding openings 112 and 114 provided in mounting elements 116 and 118, respectively, which project into first supply chamber 24 from central wall 28. Bolts 120 are threaded into corresponding openings 122 and 124 in mounting elements 116 and 118, respectively, in order to retain ends of mounting pin 110 in corresponding openings 112 and 114. In such a manner, lever 48 is pivotably connected to regulator body 14. Sealing element 126 is interconnected to upper end 128 of lever 48. Sealing element 126 includes seal 134 connected to second end 128 of lever 48 by molded projection 132 or the like which projects from a side of seal 134 into an opening in second end 128 of lever 48. Seal 134 is of sufficient dimension so as to overlap orifice 136 in holding chamber portion 16 of regulator body 14, for reasons hereinafter described. Backing member 130 is seated on projection 132 to provide rigidity to seal 134.

Referring to FIGS. 2A–2B, a generally conical spring retention member 138 projects axially from second surface 34 of central wall 28 into first supply chamber 24. A first end 140 of a spring 142 is positioned over spring retention member 138 so as to prevent spring 142 from sliding along second surface 34 of central wall 28. A second end 144 of spring 140 is interconnected to a lower end 146 of lever 148, and urges second end 146 of lever 148 into contact with diaphragm structure 150, as hereinafter described. Diaphragm structure 150 includes a generally circular diaphragm 152 formed from a flexible material. Diaphragm 152 includes a radially outer edge 154 having a plurality of circumferentially spaced ears 156 projecting radially therefrom. Each ear 156 projecting from the outer edge 154 of diaphragm 152 includes a corresponding mounting aperture 158 therethrough.

Diaphragm support 160 is positioned against first side 162 of diaphragm 152. Diaphragm support 160 is generally circular in shape and has a diameter less than the diameter of diaphragm 152. Diaphragm support 160 includes a central hub 163 and an outer ring 164 interconnected by a plurality of circumferentially spaced spokes 166. Diaphragm support 160 is interconnected to first side 162 of diaphragm 152 by rivet 168 which extends through central hub 163 of diaphragm support 160; through center 170 of diaphragm 152; and through the center of support disc 172 to maintain the connection between diaphragm support 160 and diaphragm 152.

Diaphragm structure 150 further includes a ring-shaped gasket or seal 174 having an inner edge 176 and a radially outer edge 178 with a plurality of ears 180 projecting radially therefrom. Ears 180 includes corresponding mounting apertures 182 therethrough which are aligned with corresponding mounting apertures 158 in ears 156 of diaphragm 152. Cover 184 is positioned adjacent second side 186 of diaphragm 152. Cover 184 includes a cup-shaped inner portion 188 having a radially outer edge 190. A ring portion 192 is interconnected to the radially outer edge 190 of inner portion 188. Ring portion 192 includes a radially outer edge 194 having a plurality of ears 196 projecting therefrom. Ears 196 include corresponding mounting apertures 198 extending therethrough which are aligned with corresponding mounting apertures 158 and 182 in diaphragm 152 and in seal 174, respectively.

In order to mount diaphragm structure 150, seal 174 is positioned adjacent second side 22 of regulator body 14 such that radially inner edge 176 of seal 74 is aligned with the intersection of side 22 and surface 36 of regulator body 14 such that mounting apertures 182 through ears 180 of seal 174 are axially aligned with corresponding mounting holes 200 extending through circumferentially spaced lobes 202 projecting from the outer periphery 18a of supply chamber portion 18 of regulator body 14. Bolts 204 are threaded through corresponding mounting apertures 198 through ears 196 of cover 184; through corresponding mounting apertures 158 through ears 156 of diaphragm 152; through corresponding mounting apertures 182 through ears 180 of seal 174 and into corresponding mounting holes 200 in lobes 202. In the assembled configuration, rivet head 168a of rivet 168 engages lower end 146 of lever 148 such that diaphragm 152 is free to be drawn into and out of second supply chamber 26.

Lever 148 within second supply chamber 26 further includes a pair of mounting flanges 206 projecting therefrom. Each mounting flange 206 includes an opening 208 therethrough. Pin 210 extends through openings 208 in mounting flanges 206. Opposite ends of pin 210 are seated within corresponding openings 212 and 214 provided in mounting elements 216 and 218, respectively, which project into second supply chamber 26 from central wall 28. Bolts 220 are threaded into corresponding openings 222 and 224 in mounting elements 216 and 218, respectively, in order to retain ends of mounting pin 210 in corresponding openings 212 and 214. In such a manner, lever 148 is pivotably connected to regulator body 14. Sealing element 226 is interconnected to upper end 228 of lever 148. Sealing element 226 includes seal 234 connected to second end 228 of lever 148 by molded projection 232 or the like which projects from a side of seal 234 into an opening in second end 228 of lever 48. Seal 234 is of sufficient dimension so as to overlap orifice 236 in holding chamber portion 16 of regulator body 14, for reasons hereinafter described. Backing member 230 is seated on projection 232 to provide rigidity to seal 234.

Holding chamber portion 16 of regulator body 14 includes a generally cylindrical wall 240 having an inner surface 242 which defines holding chamber 244. Cylindrical wall 240 includes orifices 136 and 236 therethrough which allow corresponding supply chambers 24 and 26, respectively, to communicate with holding chamber 244. Cylindrical wall 240 includes an upper end 246 which defines an inlet 248 for reasons hereinafter described.

Holding chamber portion 16 of regulator body 14 includes fuel inlet chamber 250 which extends about the outer surface 252 of cylindrical wall 240 and along the longitudinal axis of holding chamber 244. First inlet 254 through holding chamber portion 16 of regulator body 14 communicates with fuel inlet chamber 250 and is adapted for receiving an end of fuel source conduit 256. Fuel source conduit 256 interconnects regulator 10 to a fuel source, such as a natural gas or liquid propane vapor. Second inlet 257 through holding chamber portion 16 of regulator body 14 communicates with fuel inlet chamber 250 and may be used to allow communication with the interior of molding chamber portion 16 of regulator body 14 for testing or the like. Plug 258 is threadable into second inlet 257 when second inlet 257 is not in use. Jet 259 having an orifice therethrough may be threaded into a blind orifice in the outer periphery 23 of regulator body 14 for storage. In circumstances when an alternate fuel source such as liquid propane is used, jet 259 is removed from outer periphery 23 of regulator body 14 and positioned within corresponding passageway 280 and 314 in holding chamber portion 16 to reduce the diameter of such passageway and to control the flow of fuel therethrough.

Figure 7:
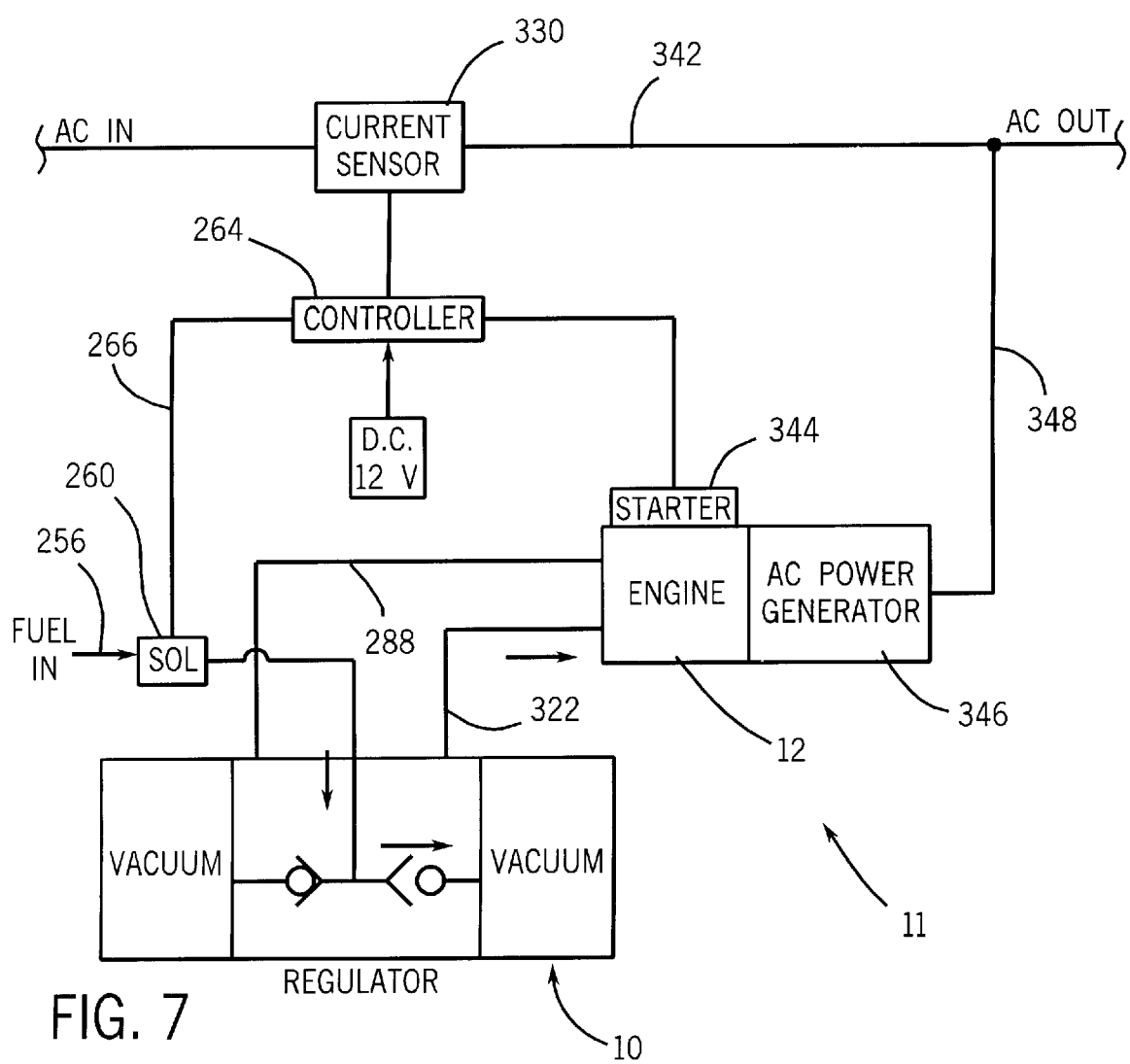
FIG. 7 is a schematic view of a generator incorporating the regulator of the present invention.

Solenoid 260 is interconnected to the upper surface 262 of holding chamber portion of regulator body 14 by bolt 263 and is operatively connected to a controller 264 through line 266, FIG. 7. Solenoid 260 includes a plunger 268 movable between a first retracted position, FIG. 3, and a second extended position, FIG.4. Plunger 268 includes terminal end 270 having seal 272 mounted thereon. Seal 272 is of a sufficient dimension such that when plunger 268 is in the extended position, FIG. 4, seal 272 engages upper end 242 of cylindrical wall 240 and overlaps inlet 248 to holding chamber 244. A spring 274 is positioned about plunger 268 so as to urge plunger 268 towards the extended position, FIG. 4.

Holding chamber portion 16 of regulator body 14 further includes a first passageway 280 therethrough. First passageway 280 includes an inlet 282 which communicates with first supply chamber 24 in supply chamber portion 18 of regulator body 14 and outlet 284. Barbed fitting 286 is threaded into outlet 284 of first passageway 280. Barbed fitting 286 is adapted for receiving a first end of conduit 288, FIG. 7, which interconnects regulator 10 to a first cylinder of two-cylinder engine 12.

Fuel adjuster 290 is provided for controlling the flow of fuel through first passageway 280 through holding chamber portion 16 of regulator body 14. Fuel adjuster 290 is generally cylindrical in shape and includes a first threaded end 292 which is threaded through an opening 294 in holding chamber portion 16 of regulator body 14 and a second opposite end 296. Pin 298 projects radially from fuel adjuster 290 adjacent end 296. It can be appreciated that as fuel adjuster 290 is threaded into and out of opening 294 in holding chamber portion 16 of regulator body 14, end 292 of fuel adjuster 290 moves into and out of interfering relationship with first passageway 280 through holding chamber portion 16 of regulator body 14 thereby controlling the volume of fuel flowing therepast. Regulating pin 300 may be selectively positioned within one of a plurality of openings 302a–d so as to limit the travel of fuel adjuster 290 in opening 294 through holding chamber portion 16 of regulator body 14. Operation of fuel adjuster 290 is fully described in Haworth et al., U.S. Pat. No. 6,068,071 assigned to the assignee of the present invention and incorporated herein by reference.

Holding chamber portion 16 of regulator body 14 further includes a second passageway 314 therethrough. Second passageway 314 includes an inlet (not shown) which communicates with second supply chamber 26 in supply chamber portion 18 of regulator body 14 and outlet 318. A barbed fitting 320 is threaded into outlet end 318 of second passageway 314. Barbed fitting 320 is adapted for receiving a first end of conduit 322, FIG. 7, which interconnects regulator 10 to a second cylinder of two-cylinder engine 12.

Fuel adjuster 324 is provided for controlling the flow of fuel through second passageway 314 through holding chamber portion 16 of regulator body 14. Fuel adjuster 324 is generally cylindrical in shape and includes a first threaded end 326 which is threaded through opening 328 in holding chamber portion 16 of regulator body 14 and a second opposite end 330. Pin 332 projects radially from fuel adjuster 324 adjacent end 330. It can be appreciated that as fuel adjuster 324 is threaded into and out of opening 328 in holding chamber portion 16 of regulator body 14, end 326 of fuel adjuster 324 moves into and out of interfering relationship with second passageway 314 through holding chamber portion 16 of regulator body 14 thereby controlling the volume of fuel flowing therepast. Regulating pin 334 may be selectively positioned within one of a plurality of openings 336a–d so as to limit the travel of fuel adjuster 314 in opening 328 in holding chamber portion 16 of regulator body 14. As with fuel adjuster 290, operation of fuel adjuster 324 is fully described in Haworth et al., U.S. Pat. No. 6,068,017 previously incorporated herein by reference.

In operation, fuel is delivered from the fuel source to fuel inlet chamber 250 through fuel source conduit 256. With solenoid 260 non-energized, plunger 268 of solenoid 260 is in the second, extended position, FIG. 4, such that the flow of fuel from fuel inlet chamber 250 to holding chamber 244 is prevented. Current sensor 340 of stand-by electrical generator 11 monitors the current provided by an AC source, such as a utility company, on line 342. Upon detection of a power outage, controller 264, operatively connected to current sensor 340, energizes solenoid 260 such that plunger 268 moves to the retracted position, FIG. 3. In addition, controller 264 directs starter 344 to start two-cylinder engine 12.

With plunger 268 of solenoid 260 in the retracted position, FIG. 3, fuel is allowed to flow from fuel inlet chamber 250 into holding chamber 244 through inlet 248. When the two-cylinder engine 12 is cranked by starter 344, a vacuum is generated by each cylinder of two-cylinder engine 12. First cylinder of two-cylinder engine 12 generates a vacuum through conduit 288; first passageway 280; and first supply chamber 24. As a vacuum is generated in first supply chamber 24, diaphragm 52 is drawn into first supply chamber 24 against the bias of spring 42. As diaphragm 52 is drawn into first supply chamber 24, rivet head 68a of rivet 68 engages lower end 46 of lever 48 and urges lower end 46 of lever 48 towards central wall 28. As lower end 46 of lever 48 is urged towards central wall 28, lever 48 pivots on mounting pin 110 such that seal 134 interconnected to upper end 128 of lever 48 disengages from orifice 136 in holding chamber portion 16 of regulator body 14 allowing holding chamber 244 to communicate with first supply chamber 24. As a result, the fuel in holding chamber 244 is drawn by the vacuum generated by the first cylinder of the two-cylinder engine 12 through first supply chamber 24; first passageway 280; and conduit 288 into the first cylinder of two-cylinder engine 12. The volume of fuel flowing through first passageway 280 through holding chamber portion 16 of regulator body 14 is controlled by fuel adjuster 290 as heretofore described.

In addition, second cylinder of two-cylinder engine 12 generates a vacuum through conduit 322; second passageway 314 and second supply chamber 26. As a vacuum is generated in second supply chamber 26, diaphragm 152 is drawn into second supply chamber 26 against the bias of spring 142. As diaphragm 152 is drawn into second supply chamber 26, rivet head 168a of rivet 168 engages lower end 146 of lever 148 and urges lower end 146 of lever 148 towards central wall 128. As lower end 146 of lever 148 is urged towards center wall 28, lever 148 pivots on mounting pin 210 such that seal 234 interconnected to upper end 228 of lever 148 disengages from orifice 236 in holding chamber portion 16 of regulator body 14 allowing holding chamber 244 to communicate with second supply chamber 26. As a result, the fuel in holding chamber 244 is drawn by the vacuum generated by the second cylinder of the two-cylinder engine 12 through second supply chamber 26; second passageway 314; and conduit 312 into the second cylinder of two-cylinder engine 12. The volume of fuel flowing through second passageway 314 through holding chamber portions 16 of regulator body 14 is controlled by fuel adjuster 324 as heretofore described.

As is conventional, during operation, engine 12 drives AC power generator 346 which produces AC power on line 348. It can be appreciated that as more fuel is required by each cylinder of two-cylinder engine 12, a greater vacuum will be generated thereby drawing diaphragms 52 and 152 further into corresponding supply chambers 24 and 26, respectively, and further opening orifices 136 and 236 in regulator body 14. Further, it is noted that each time a cylinder or piston comes down in two-cylinder engine 12, a negative pressure is created thereby urging diaphragms 52 and 152 back towards their original position. In other words, diaphragms 52 and 152 continually vibrate during operation of two-cylinder engine 12.

Various modes of carrying out the invention are contemplated as being within the scope of the following claims particularly pointing out and distinctly claiming the subject matter which is regarded as the invention.

We claim:

1. A regulator for regulating the supply of fuel to an engine, comprising:

a regulator body including a holding chamber connectable to a fuel source, first and second supply chambers connectable to the engine, a first orifice between the fuel source and the first supply chamber, and a second orifice between the fuel source and the second supply chamber;

a solenoid connectable to the engine and being movable between a closed position preventing the flow of fuel into the holding chamber and an open position allowing the flow of fuel into the holding chamber in response to activation of the engine;

a first regulating structure movable between a closed position wherein the first orifice is closed and an open position wherein the first orifice is open in response to the demand for fuel by a first cylinder of the engine; and a second regulating structure movable between a closed position wherein the second orifice is closed and an open position wherein the second orifice is open in response to the demand for fuel by a second cylinder of the engine.

2. The regulator of claim 1 further comprising:

a fuel source conduit having an input connectable to the fuel source and an output communicating with the holding chamber in the regulator body; and a first engine conduit having an input communicating with the first supply chamber in the regulator body and an output connectable to a first cylinder of the engine.

3. The regulator of claim 2 further comprising a fuel adjuster extending into the first engine conduit, the fuel adjuster being movable between first and second positions for regulating the volume of fuel flowing therepast.

4. The regulator of claim 1 wherein the regulating structure includes:

a lever having first and second opposite ends and being pivotably mounted to the regulator body within the first supply chamber, the lever pivotable between a first closing position and a second open position; and a seal mounted on the first end of the lever, the seal overlapping the first orifice with the lever in the closing position.

5. The regulator of claim 4 wherein the regulating structure further includes a diaphragm interconnected to the second end of the lever, the diaphragm movable within the first supply chamber in response to the fuel demand by the first cylinder of the engine between a first position wherein the lever is the closing position and a second position wherein the lever is the open position.

6. The regulator of claim 5 further comprising a biasing structure for urging the diaphragm towards the first position.

7. A regulator for regulating the supply of fuel to each cylinder of a multiple cylinder engine, comprising:

a regulator body defining a first supply chamber and a second supply chamber, each supply chamber connectable to a fuel source;

a first cylinder conduit having an input communicating with the first supply chamber in the regulator body and an output connectable to a first cylinder of the engine;

a second cylinder conduit having an input communicating with the second supply chamber in the regulator body and an output connectable to a second cylinder of the engine;

a first regulating structure movable between a closed position preventing communication between the first supply chamber and the fuel source and an open position allowing communication between the first supply chamber and the fuel source in response to the fuel demanded by the first cylinder of the engine; and a second regulating structure movable between a closed position preventing communication between the second supply chamber and the fuel source and an open position allowing communication between the second supply chamber and the fuel source in response to the fuel demanded by the second cylinder of the engine.

8. The regulator of claim 7 further comprising a fuel source conduit having an input connectable to a fuel source and an output communicating with the first and second supply chambers in the regulator body.

9. A system for regulating the flow of fuel to each cylinder of an engine of a generator, comprising:

a controller for sensing activation of the generator;

a regulator body defining a holding chamber having an inlet, a first supply chamber having an outlet and a second supply chamber having an outlet, the regulator body including a first orifice between the holding chamber and the first supply chamber and a second orifice between the holding chamber and the second supply chamber;

a fuel source conduit having an input connectable to a fuel source and an output operatively connectable to the input of the holding chamber in the regulator body;

a first cylinder conduit having an input operatively connected to the output of the first supply chamber in the regulator body and an output connectable to a first cylinder of the engine;

a second cylinder conduit having an input operatively connected to the output of the second supply chamber in the regulator body and an output connectable to a second cylinder of the engine;

a solenoid operatively connected to the controller and having a plunger, the plunger movable between a first a closed position wherein the plunger is seated within the inlet of the holding chamber so as to prevent the flow of fuel into the holding chamber from the fuel source conduit to a second open position wherein the plunger is removed from the inlet of the holding chamber so as to allow the flow of fuel into the holding chamber from the fuel source conduit in response to the controller sensing activation of the engine;

a first regulating structure disposed in the first supply chamber and being movable between a first closed configuration wherein the first orifice is closed and a second open configuration wherein the first orifice is open in response to the fuel demanded by the first cylinder of the engine; and a second regulating structure disposed in the second supply chamber and being movable between a first closed configuration wherein the second orifice is closed and a second open configuration wherein the second orifice is open in response to the fuel demanded by the second cylinder of the engine.

10. The system of claim 9 wherein the first regulating structure includes:

a lever having first and second opposite ends and being pivotably mounted to the regulator body within the first supply chamber, the lever pivotable between a first closing position wherein the first regulating structure is in the closed configuration and a second open position wherein the first regulating structure is in the open configuration;

a seal mounted on the first end of the lever, the seal overlapping the first orifice with the lever in the closing position; and a diaphragm moveably disposed in the first supply chamber and being interconnected to the second end of the lever such the diaphragm moves the lever between the closing and open positions in response to the fuel demand by the first cylinder of the engine.

11. The system of claim 10 wherein the second regulating structure includes:
   a lever having first and second opposite ends and being pivotably mounted to the regulator body within the second supply chamber, the lever pivotable between a first closing position wherein the second regulating structure is in the closed configuration and a second open position wherein the second regulating structure is in the open configuration;
   a seal mounted on the first end of the lever of the second regulating structure, the seal of the second regulating structure overlapping the second orifice with the lever of the second regulating structure in the closing position; and
   a diaphragm moveably disposed in the second supply chamber and being interconnected to the second end of the lever of the second regulating structure such that the diaphragm of the second regulating structure moves the lever of the second regulating structure between the closing and open positions in response to the fuel demanded by the second cylinder of the engine.

12. The system of claim 11 wherein the diaphragm of the first regulating structure is movable between a first cut-off position wherein the lever of the first regulating structure is in the closing position and a second open position wherein the lever of the first regulating structure is in the open position.

13. The system of claim 12 wherein the diaphragm of the second regulating structure is movable between a first cut-off position wherein the lever of the second regulating structure is in the closing position and a second open position wherein the lever of the second regulating structure is in the open position.

14. The system of claim 9 further comprising:
   a first fuel adjuster extending into the first cylinder conduit, the first fuel adjuster movable between first and second positions for regulating the volume of fuel flowing therepast; and
   a second fuel adjuster extending into the second cylinder conduit, the second fuel adjuster movable between first and second positions for regulating the volume of fuel flowing therepast.

15. The system of claim 9 wherein the holding chamber of the regulator body includes a jet having an orifice of a predetermined diameter, the jet receivable in the first cylinder conduit for controlling the flow of fuel therethrough.

16. A regulator for regulating the supply of fuel to each cylinder of a multiple cylinder engine, comprising:
   a regulator body defining a first supply chamber and a second supply chamber, each supply chamber connectable to a fuel source, the regulator body further defining a holding chamber and includes a first orifice between the holding chamber and the first supply chamber and a second orifice between the holding chamber and the second supply chamber and wherein the output of the fuel source conduit communicates with the holding chamber;
   a first cylinder conduit having an input communicating with the first supply chamber in the regulator body and an output connectable to a first cylinder of the engine;
   a second cylinder conduit having an input communicating with the second supply chamber in the regulator body and an output connectable to a second cylinder of the engine;
   a first regulating structure movable between a closed position wherein the first orifice is closed and open position wherein the first orifice is open in response to the fuel demanded by the first cylinder of the engine; and
   a second regulating structure movable between a closed position wherein the second orifice is closed and open position wherein the second orifice is open in response to the fuel demanded by the second cylinder of the engine.

17. The regulator of claim 16 further comprising a solenoid connectable to the engine and being movable in response to activation of the engine between a closed position wherein the flow of fuel from the fuel source conduit to the holding chamber is prevented and an open position wherein the flow of fuel from the fuel source conduit to the holding chamber is allowed.

18. The regulator of claim 16 wherein the first regulating structure includes:
   a lever having first and second opposite ends and being pivotably mounted to the regulator body within the first supply chamber, the lever pivotable between a first closing position and a second open position;
   a seal mounted on the first end of the lever, the seal overlapping the first orifice with the lever in the closing position; and
   a diaphragm moveably disposed in the first supply chamber and being interconnected to the second end of the lever such that the diaphragm moves the lever between the closing and open positions in response to the fuel demanded by the engine.

19. The regulator of claim 18 wherein the second regulating structure includes:
   a lever having first and second opposite ends and being pivotably mounted to the regulator body within the second supply chamber, the lever pivotable between a first closing position and a second open position;
   a seal mounted on the first end of the lever of the second regulating structure, the seal of the second regulating structure overlapping the second orifice with the lever of the second regulating structure in the closing position; and
   a diaphragm moveably disposed in the second supply chamber and being interconnected to the second end of the lever of the second regulating structure such that the diaphragm of the second regulating structure moves the lever of the second regulating structure between the closing and open positions in response to the fuel demanded by the second cylinder of the engine.

20. A regulator for regulating the supply of fuel to each cylinder of a multiple cylinder engine, comprising:
   a regulator body defining a first supply chamber and a second supply chamber, each supply chamber connectable to a fuel source,
   a first cylinder conduit having an input communicating with the first supply chamber in the regulator body and an output connectable to a first cylinder of the engine;
   a second cylinder conduit having an input communicating with the second supply chamber in the regulator body and an output connectable to a second cylinder of the engine;
   a first fuel adjuster extending into the first cylinder conduit, the first fuel adjuster movable between first and second positions for regulating the volume of fuel flowing therepast; and
   a second fuel adjuster extending into the second cylinder conduit, the second fuel adjuster movable between first and second positions for regulating the volume of fuel flowing therepast.

* * * * *